(No Model.) 3 Sheets—Sheet 1.

B. G. LUTHER.
MATCHING MACHINE.

No. 403,201. Patented May 14, 1889.

Witnesses.
James W. Beaumun
Mark A. Heath

Inventor:
Benjamin G. Luther
per J. Scholfield
Attorney (No Model.) 3 Sheets—Sheet 3.

B. G. LUTHER.
MATCHING MACHINE.

No. 403,201. Patented May 14, 1889.

Witnesses.
James W. Beaman
Mark A. Heath

Inventor.
Benjamin G. Luther
per J. Scholfield
attorney

N. PETERS, Photo-Lithographer, Washington, D. C.

UNITED STATES PATENT OFFICE.

BENJAMIN G. LUTHER, OF WORCESTER, MASSACHUSETTS.

MATCHING-MACHINE.

SPECIFICATION forming part of Letters Patent No. 403,201, dated May 14, 1889.

Application filed November 19, 1888. Serial No. 291,243. (No model.)

*To all whom it may concern:*

Be it known that I, BENJAMIN G. LUTHER, a citizen of the United States, residing at Worcester, in the county of Worcester and State of Massachusetts, have invented a new and useful Improvement in Matching-Machines, of which the following is a specification.

The object of my invention is to provide a machine in which tapering boards, or boards of different width, as employed in the manufacture of packing-boxes, can be provided with tongue and groove at their opposite edges simultaneously; and it consists in the arrangement of the shaft of the saw or cutter upon a pivoted frame above the table, with an adjustable guide for properly gaging the depth of the cut to be made in the edge of the board, and also in the arrangement of the shaft of a saw or cutter upon a pivotal frame, with means for depressing the saw or cutter below the plane of the surface of the table at the will of the operator to prevent the action of the saw or cutter upon the edge of the board when desired.

Figure 1:
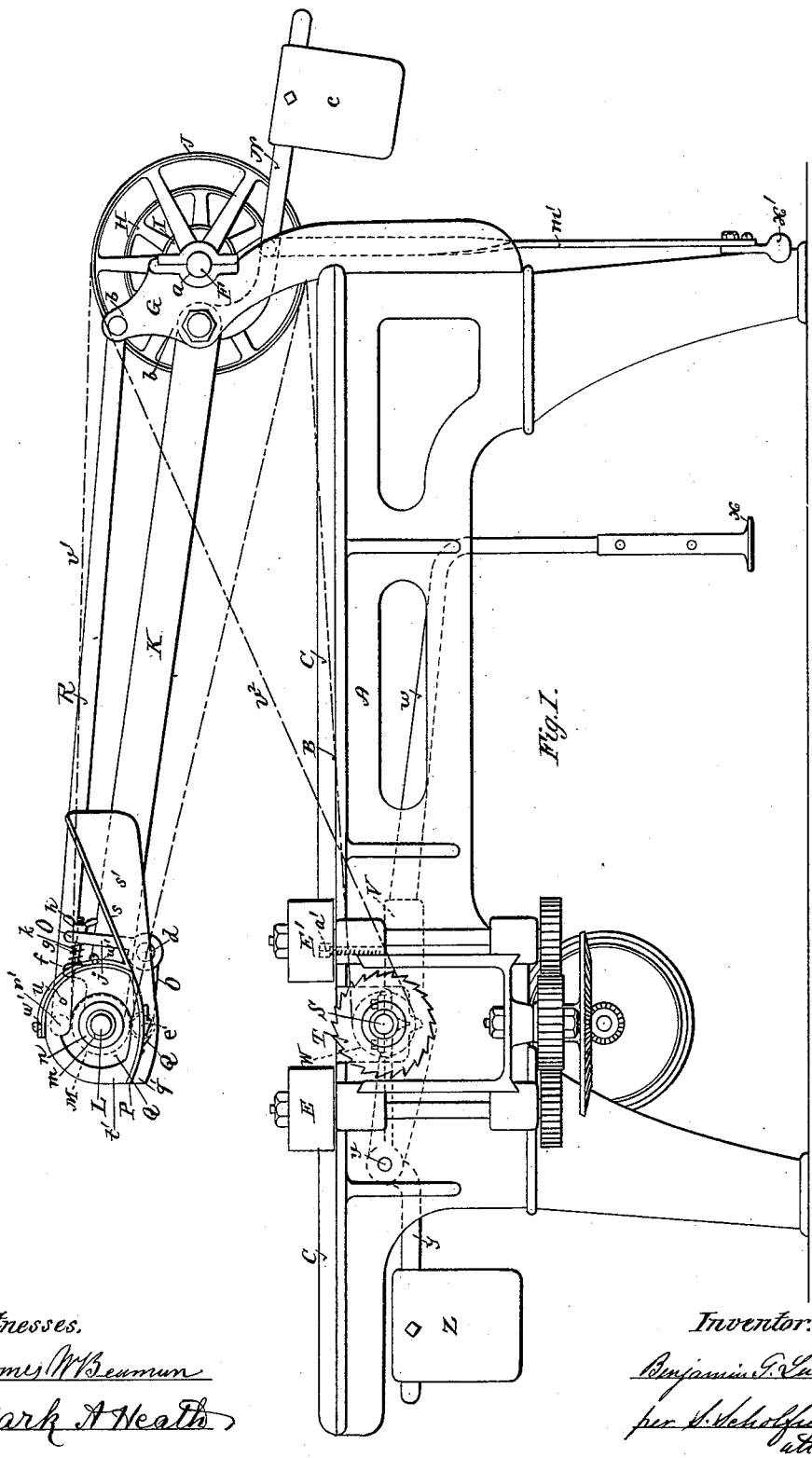
Figure 2:
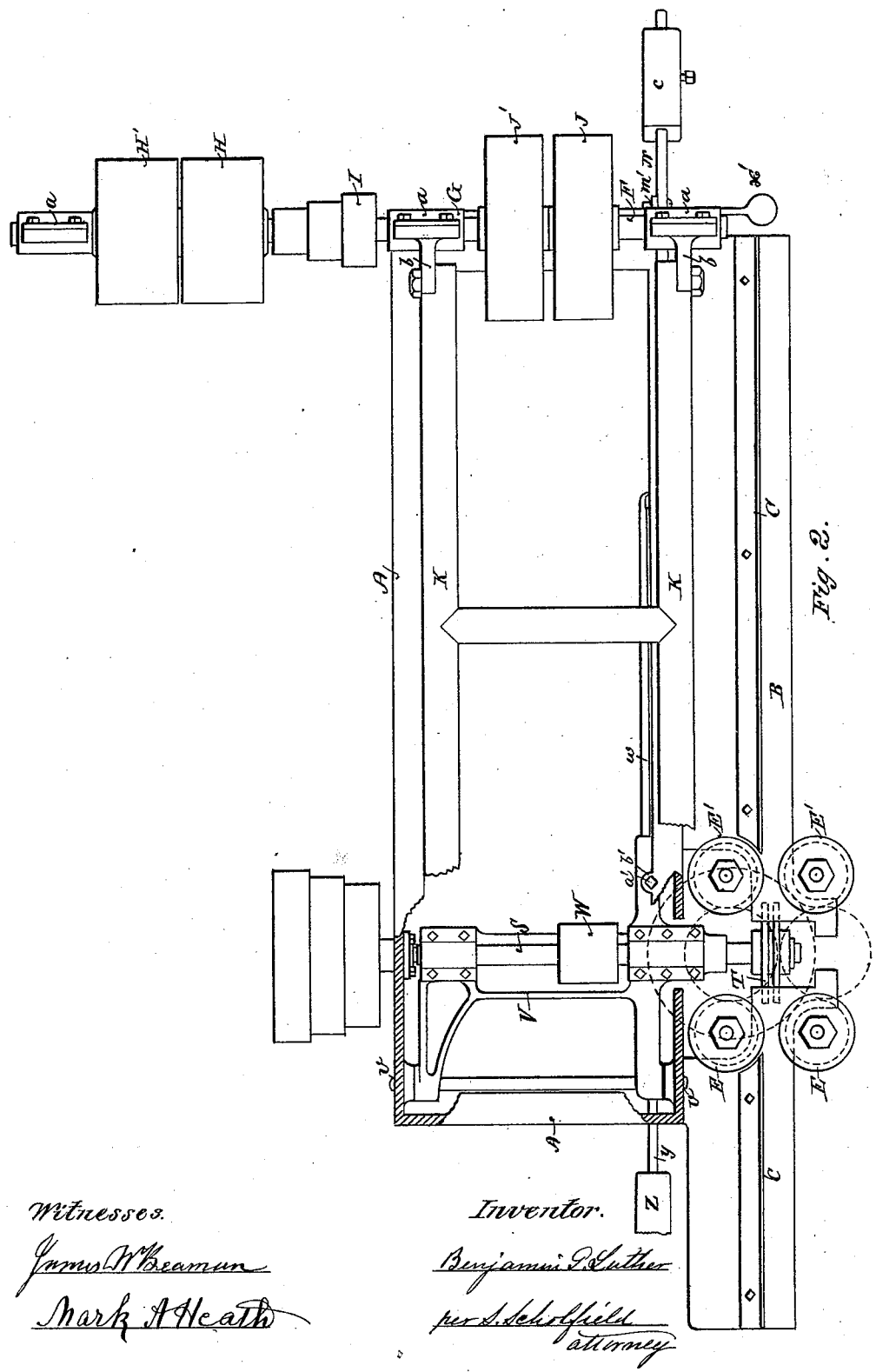
Figure 3:
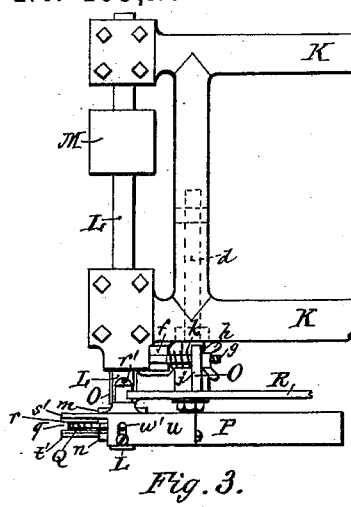
Figure 8:
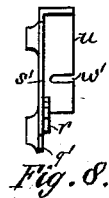
Figure 6:
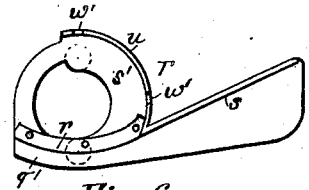
Figure 7:
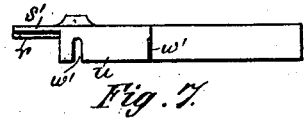
Figure 4:
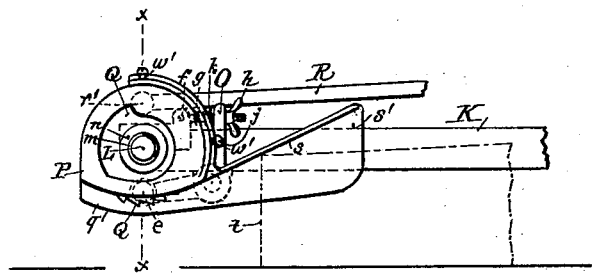
Figure 5:
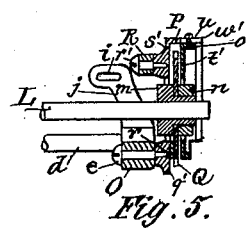
Figure 10:
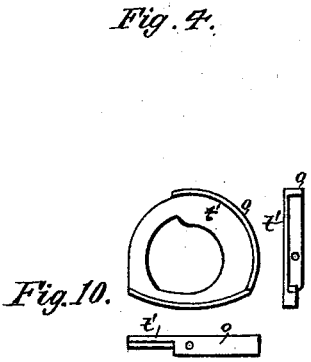
Figure 9:
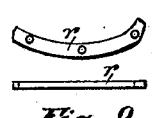
Figure 11:
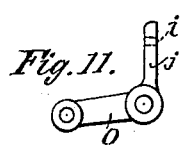
Figure 12:
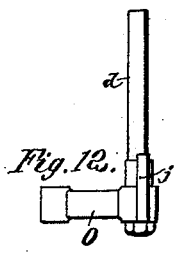
Figure 13:
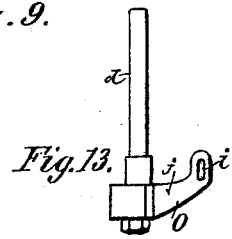

Figure 1 represents a side elevation of my improved matching-machine. Fig. 2 represents a top view with the upper saw or cutter removed, its pivoted holding-frame being broken away in order to show the pivoted holding-frame of the lower saw or cutter. Fig. 3 is a top view of the outer end of the holding-frame for the upper saw or cutter. Fig. 4 is a corresponding side elevation of the same, showing the line of the table and the end of an entering board by broken lines. Fig. 5 is a vertical section taken in the line $x\ x$ of Fig. 4. Fig. 6 represents the front elevation of the foundation-plate of the guide for the edge of the board. Fig. 7 is a top view of the same. Fig. 8 is a forward end view. Fig. 9 shows side and edge views of the removable piece for forming the shoe portion of the edge guide at the inner side of the saw or cutter. Fig. 10 shows side, top, and forward edge views of the supplementary plate which forms the shoe portion of the edge guide at the front side of the saw or cutter. Fig. 11 represents a side view of the bell-crank lever to which the adjustable guide is attached. Fig. 12 represents a top view of the same and the attached shaft. Fig. 13 represents a side view of the upper arm of the bell-crank lever, showing the slot to receive the adjusting-bolt.

In the accompanying drawings, A is the frame of the machine; B, the feeding-table. C C are fixed side guides arranged to guide the boards at their inner side, and E E and E' E' are the feeding-rollers, which serve to carry the board forward under the action of the saws or cutters which act upon the edges of the board. The driving-shaft F is supported in the bearings $a\ a\ a$ of the bracket G, which is attached to one end of the frame A, and upon the shaft F are placed the tight and loose pulleys H H', by means of which operative connection is made to the machine, the cone-pulley I, for driving the feeding-rollers, and the pulleys J and J', for driving the saws or cutters.

The bracket G is provided with the inwardly-directed ears $b\ b$, to which is pivoted the frame K, bearing at its outer end the shaft L, which carries the saw or cutter for operating upon the upper edge of the board. Upon the shaft L is placed the pulley M, from which connection is made by open belt $v'$ with the pulley J' upon the shaft F, as shown by the broken lines in Fig. 1, and to the arm N, which extends backward from the frame K, is secured the weight $c$, which is adapted to partially balance the weight of the frame K, so that the bearing-surface of the guide P will rest with the proper pressure upon the upper edge of the board. To the bell-crank lever O, attached to a short shaft, $d$, which is held in suitable bearings at the under side of the frame K, is pivoted the guide P by means of the screw-stud $e$, which stud is located at a short distance below the shaft L, and upon the frame K is formed an ear, $f$, to the upper end of which is pivoted the bolt $g$, provided with the thumb-nut $h$, the said bolt $g$ passing through the slot $i$ in the upwardly-extending arm $j$ of the bell-crank lever O, the said slot being shown in Fig. 13, and upon the bolt $g$, between the ear $f$ and the arm $j$, is placed the spiral spring $k$, whereby upon screwing up the thumb-nut $h$ the bearing-surface of the guide P will be carried downward from the saw or cutter shaft L, and upon unscrewing the said nut the bearing-surface will be carried upward toward the saw or cutter shaft, and by this means the depth of the cut of the saw or cutter Q in the edge of the board can be properly regulated, and proper compensating adjustment can also be made for the wear of the saw or cutter in continued use. The saw or cutter Q is held upon a sleeve, $m$, which is secured by set-screw to the shaft L and provided with the nut $n$, adapted to screw up against the side of the saw or cutter. The curved piece $r$ (shown in Fig. 9) is attached by means of screws to the side of the main plate $s'$ of the guide P, the said piece $r$ forming the bearing-shoe at the inner side of the saw or cutter Q, which in this case is employed for forming a groove in the upper edge of the board, and the plate $t'$, (shown in Fig. 10,) which forms the bearing-shoe at the outer side of the saw or cutter, is attached to the flange $u$ of the main plate $s'$ of the guide by means of screws passing through the slots $w'$ in the flange $u$ and into the rim $o$ of the plate $t'$, and when so attached the surface of the lower edge of the plate $t'$ will be in the same horizontal plane with the corresponding under surface of the attached piece $r$, leaving an intervening space, $q$, for the free movement of the saw or cutter, the flange $q'$ of the main plate $s'$ at the same time extending downward for a short distance at the inner side of the board below the bearing-shoe piece $r$.

In order that the guide P should be held in the same parallel position with the feeding-table at all required angular positions of the frame K, I pivot one end of the rod R to the fixed ear $b$ upon the bracket G and the other end of the same to the side of the main plate $s'$ of the guide P at the screw-stud $r'$ above the shaft L, so that the rod R will form a portion of a parallel movement to preserve the proper relative position of the guide P through the extreme limit of the working movement of the frame K. The guide-plate $s'$ is provided with an inclined under surface, $s$, which is adapted to engage with the forward end of the board $t$, as shown by the broken lines in Fig. 4, and the continued forward movement of the board after its first contact with the incline $s$, caused by the feeding movement of the rollers E' E', will serve to raise the frame K and saw or cutter Q to the proper elevation to operate upon the edge of the board; and the saw or cutter Q will thereafter be automatically varied in height, according to the width of the board, thus providing for any required degree of taper in the same. The shaft S, which carries the lower saw or cutter, T, to form the tongue, is held in the frame V, which is pivoted to the frame A at the points $v\ v$, the said frame being provided with the attached downwardly-turned arm $w$, the lower end of which is provided with the pedal $x$, and to an arm, $y$, extending forward from a line joining the pivoting-points of the frame V, is secured the counterbalancing-weight Z, which is to be so proportioned that the pedal $x$ will be held in its elevated position by means of the said weight, or an equivalent spring may be employed, the elevated position of the frame V and saw or cutter T being regulated by means of the stop-screw $a'$, which passes downward through the ear $b'$ of the frame A, and by means of the stop-screw $a'$ the saw or cutter T can be adjusted to cut to the desired depth in the edge of the board, and whenever it is desired to leave the edge of the board without a tongue the operator has only to press down with his foot upon the pedal $x$, thus depressing the frame V and saw or cutter T, so that the same cannot act upon the edge of the board as it passes through the machine. The frame K can be raised to its proper working position by means of the pedal $x'$, which is connected to the arm N and frame K by means of the rod $m'$, and the feed-rollers E E, E' E' are arranged and driven as usual in such machines.

The shaft S is provided with a pulley, W, which is driven from the pulley J by means of the cross-belt $v^2$. (Shown by broken lines in Fig. 1.)

I claim as my invention—

1. In a matching-machine, the combination, with the feeding-rollers and the table or support for one edge of the board, of a pivoted frame located above the table or support, a saw or cutter held upon a shaft in the pivoted frame, and an adjustable guide pivoted to the pivoted frame for gaging the depth of the cut to be made in the edge of the board, substantially as described.

2. In a matching-machine, the combination, with the feeding-rollers and the table or support for one edge of the board, of a pivoted frame, a saw or cutter held upon a shaft in the pivoted frame, the adjustable guide pivoted to the pivoted frame and adapted to gage the depth of the cut to be made in the edge of the board, and the rod which forms the parallel movement for preserving the proper relation of the guide and the table or support for the board at the varying inclination of the pivoted frame, substantially as described.

3. In a matching-machine, the combination, with the feeding-rollers and a table or support for one edge of the board, of a pivoted frame, a saw or cutter held upon a shaft in the pivoted frame, the adjustable guide adapted to gage the depth of the cut to be made in the edge of the board, the pivoted lever and screw-bolt for adjusting the guide, and the connecting-rod which forms the parallel movement for preserving the proper relation of the guide and the table or support for the board, substantially as described.

BENJAMIN G. LUTHER.

Witnesses:
 HENRY F. HARRIS,
 LOUIS CUTTING.